United States Patent Office 3,151,454
Patented Oct. 6, 1964

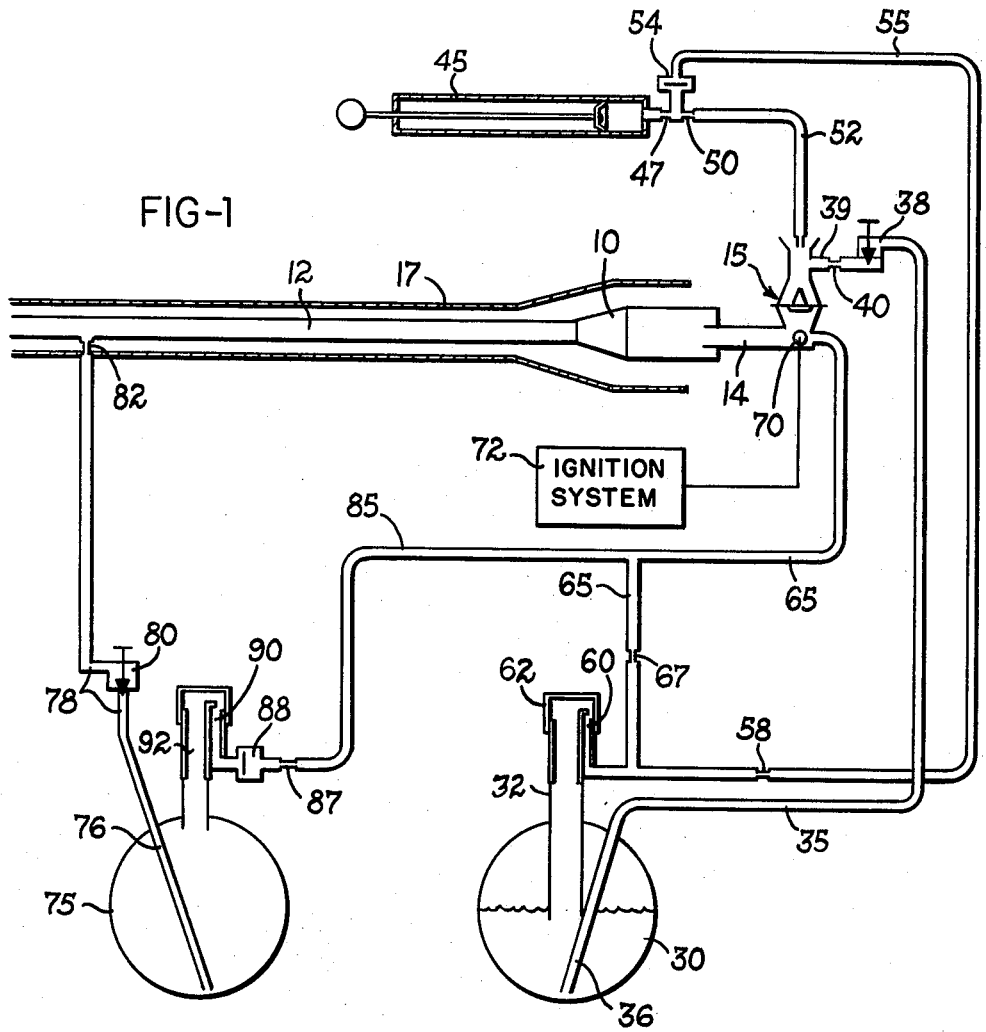
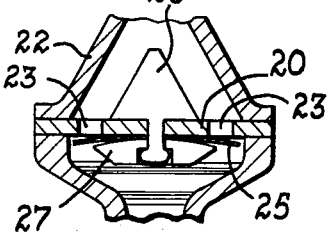
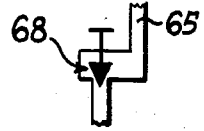

3,151,454
STARTING AND FUEL SYSTEM FOR
PULSE JET DEVICES
Russell R. Curtis, Westfield, Ind., assignor to Curtis
Dyna-Products Corporation, a corporation of Ohio
Filed Apr. 24, 1961, Ser. No. 105,164
3 Claims. (Cl. 60—39.77)

This invention relates to a fuel feeding system particularly adapted for starting and maintaining the operation of a resonant intermittent combustion device, often referred to in the art as a pulse jet burner or engine.

The present invention deals particularly with a resonant intermittent combustion device used in, and forming an essential part of, a fog or mist generating apparatus. The general arrangement of such a device is shown in the United States patent to Tenney No. 2,857,332. Thus, a small portion of the pressure gases developed in the combustion device are tapped or otherwise diverted from the main combustion system and are used to develop a feeding pressure in a closed fuel tank and in a closed tank containing formulation to be atomized and sprayed, such as a liquid insecticide. Such apparatus is particularly advantageous in small portable devices, since there are relatively few moving parts, there is little maintenance required, and they are relatively lightweight and thus easy to transport. In accordance with the general theory of a simple, lightweight, economical and maintenance free device, it is desirable to have a reliable starting system and a fuel and insecticide supply system which is of the same nature.

Various arrangements have been proposed for starting pulse jet burners or combustion devices by directing air under pressure from a simple reciprocating air pump, manually operated, into the inlet throat of the burner, and simultaneously supplying a quantity of starting fuel to be mixed with the starting air and resultant combustible mixture is ignited in the burner chamber to initiate operation. Once started, combustion proceeds in a cyclic resonant fashion, dependent upon the design of the burner and its tailpipe, and in accordance with principles known in the art and explained, for example, in the aforementioned Tenney patent. But many arrangements proposed have been found to flood the burner with an over-rich air-fuel mixture, making starting difficult or time consuming.

The primary object of this invention is to provide a novel starting fuel and air supply system for initiating combustion in intermittent combustion apparatus.

Another object of the invention is to provide a novel arrangement for starting pulse jet combustion devices or burners and for maintaining the correct fuel flow, and therefore air-fuel ratio, of the fuel supply to the burner.

An additional object of this invention is to provide such a novel starting and fuel system for pulse jet combustion devices wherein a portion of the pressurizing system for maintaining fuel flow during operation is also utilized to maintain a proper flow of insecticide or other liquid to be atomized, in creating a fog.

A further object of this invention is to provide a novel pulse jet fog generator or the like in which the main check valve controlling the admission of fuel-air mixture to the combustion chamber of the apparatus is partially open in its dormant or non-operative position, or is at least of such design that it can be opened by a low pressure flow of air from outside the chamber, thus facilitating the supply of a starting air-fuel mixture to the combustion chamber.

Another object of this invention is to provide a novel starting system for pulse jet combustion devices incorporating a manually operated air pump which functions to direct a flow of starting air into the combustion chamber and also a flow for pressurizing air into a closed fuel tank for causing an initial pulse like flow of fuel to the engine for admixture with the starting air, and wherein the capacities of such pump and the fuel tank are so proportioned that each pressure creating stroke of the pump will produce a corresponding pulse or momentary flow of fuel for starting purposes.

Other objects and advantages of the invention will be apparent from the following description, the accompanying drawings and the appended claims.

In the drawing—

FIG. 1 is a diagrammatic illustration of a preferred arrangement of a starting and fuel and insecticide feed system for a pulse jet fog generator, according to the invention;

FIG. 2 is an enlarged and somewhat schematic detail section view through a part of the main admission valve to the combustion chamber; and FIG. 3 is a partial view showing in schematic fashion a modified flow control arrangement for pressuring gases in accordance with the invention.

Referring to the drawing, which illustrates a preferred embodiment of the invention, the apparatus includes an intermittent combustion device having a combustion chamber 10 opening directly into an elongated tailpipe 12, and opening into an inlet passage or antechamber 14 incorporating a one way or check valve 15 which controls the flow of fuel and air mixture into the combustion chamber. These parts form a resonant combustion system in which fuel-air charges are burned at a predetermined frequency, exhausting through the tailpipe 12 and creating a momentary low pressure condition in the combustion chamber after ignition of a charge which causes the valve 15 to open and admitting or causing the intake of the subsequent charge to be ignited. Once the device is in operation, the heat of the previous combustion is normally sufficient to ignite the incoming charge thus maintaining the cyclic combustion of charges in this fashion. Further explanation of the theory of operation is unnecessary here, since it is known in the prior art, and forms no specific part of this invention. Since the apparatus provided by the invention normally is used in a stationary position, a cooling shroud 17 is formed about the combustion chamber and tailpipe, extending beyond the tailpipe so that the ejected flow of hot products of combustion will induce a flow of cooling air over the chamber and tailpipe, through the shroud.

The valve which controls the intake of charges to the burner is shown in greater detail in FIG. 2. It includes a valve plate 20 mounted between the end of the inlet tube or antechamber 14 and the inlet throat member 22. The valve plate has a plurality of holes or similar passages 23 therethrough, and these are traversed by a series of flexible valving members 25. A convenient construction of such a device is a unitary member of thin flexible metal or equivalent material having a plurality of petals extending outwardly from its hub, there being one petal for each passage 23. The valve members 25 are supported to the rear by a back-up ring or plate 27 which is in turn secured to a flow directing cone 28 on the inlet side of the valve.

The fuel supply system for the burner includes a closed tank 30 having a fill tube 32 which extends into the tank to a level substantially below the top thereof, thus, since the tank is closed, establishing the level to which the tank can be filled at a location substantially below the top, as shown in FIG. 1. The fuel supply line 35 is connected to a standpipe 36 projecting essentially to the bottom of tank 30, and line 35 extends to an adjustable valve 38 which is in turn connected to the inlet fuel line 39 opening into the throat member 22, and containing a fuel metering orifice 40. This metering orifice is of such size that the engine receives fuel at the correct relatively steady rate under the fuel tank pressure provided by the burner, as will presently be described.

The starting system includes an air supply device preferably in the form of a manually operable reciprocating air pump 45. The output of this pump is directed through a metering orifice 47 and then divided into flow through the starting air control orifice 50 which is in the starting air line 52 leading into the throat member 22, and a starting pressurizing air flow which is directed through check valve 54 into the pressurizing line 55. This line contains a control orifice 58, and downstream of this orifice line 55 is connected into a riser passage or tube 60 within the cover 62 for the fuel tank fill pipe. The riser is provided for preventing fuel from flowing into the pressurizing system when the tank is being filled, or when the machine is placed in various attitudes during transportation or setting up. It is important to avoid this condition since if fuel gets into the pressurizing system the combustion device may be immediately flooded upon an attempted start, as will be explained in further detail.

A further pressurizing line 65 extends from the antechamber or inlet tube 14 of the combustion chamber to a pressurizing control orifice 67, and the other side of this orifice is connected into the pressurizing line 55 between orifice 58 and riser 60. In some instances it may be desirable to have the orifice 67 adjustable, and for this purpose an alternate arrangement is shown schematically in FIG. 3, wherein the adjustable metering valve 68 is shown in line 65 in place of the fixed orifice 67. An ignition system is shown schematically as including an igniter 70, such as a spark plug or glow plug, energized from a suitable ignition control system 72. The igniter is normally energized only during starting, since combustion proceeds cyclically and automatically once initiated.

The single stroke capacity of pump 45 is so related to the volume of air or pressurizing space in tank 30, determined by the extended fill pipe 32, and the capacities of orifices 50 and 58 are so related, that a stroke of the starting air pump 45 will cause a momentary flow or pulse of liquid fuel to flow through standpipe 36 and the starting fuel line 35, and to pass through the metering orifice into the burner throat 22. At the same time, a proportionate flow of starting air, determined by the size of orifice 50, will be directed into the throat member. This flow of starting air is a relatively low pressure flow, and is not to be understood as a high velocity jet or stream of air. The valve members 25 are either partially open in their normal at rest position, as shown in FIG. 2, or they are of such flexibility that they will open readily under the relatively low velocity starting air flow. The throat member 22 as well as the passages 23 and valve members 25 are all wetted by the starting fuel flow, and thus the starting air flow vaporizes sufficient liquid fuel from these surfaces to form a combustible air fuel mixture, and this starting charge is ignited by the igniter 70, causing combustion of the charge in the burner.

Once the combustion process has started, the pressure conditions within the chamber will vary between relatively positive and relatively negative phases, in accordance with the operating cycle of the combustion device. The peak positive pressures are of greater magnitude (with respect to zero or atmospheric pressure) than the peak negative pressures. The orifice 67 in the pressurizing line 65 (or the adjustable orifice valve 68) serves to damp these fluctuations into a net positive downstream pressure and determines the positive pressure applied to the space above the fuel in tank 30. Thus sufficient pressure is maintained in the tank to cause continued steady flow of fuel through the supply line 35. The throat member 22 does not function as a venturi, thus fuel metering is not dependent upon the mass of air entering. Orifice 40 is accurately sized according to the normal "running pressure" maintained in the tank and thus is responsible for maintaining the proper fuel metering and control of the air fuel mixture supplied to the burner during running. Orifice 40 is of such small cross-section that frictional resistance is a major factor in determining the flow rate through it. Thus, changes in fuel feeding pressure, for example from 1½ to about 3½ p.s.i.g., have only a very minor affect on fuel flow. At the same time, changes in head in the fuel line due to changes in attitude of the machine are effectively cancelled.

If a fine adjustment of the rate of fuel flow, and therefore air-fuel ratio, is required then the valve 68 may be substituted for the fixed orifice 67, controlling the fuel tank pressure which in turn controls the pressure drop across metering orifice 40 to afford a fine adjustment of the air-fuel ratio. This may be particularly useful in overcoming slight differences in manufacture to obtain machines having the same heat output, and fogging capacity.

As noted previously, this invention is particularly directed to the use of pulse jet combustion devices as the motive power for fog or mist generators. Thus, a formulation tank 75 is provided having a standpipe 76 connected to a formulation supply line 78. In this line there is an adjustable metering valve 80, and downstream of this valve a flow limiting orifice 82. Flow through this orifice is directed into the tailpipe 12 of the combustion device, preferably somewhat upstream from its end as shown and the liquid formulation is thus fed into the high velocity hot receiprocating gases in the exhaust tube of the burner, resulting in vaporization and atomization thereof to produce a fog or mist. The flow of formulation is maintained by a pressurizing system including a line or pipe 85 branching from the fuel pressurizing line 65 upstream of orifice 67, and extending to a restricting orifice 87 and thence to a check valve 88. Gases under pressure passing the check valve are admitted through riser 90 and fill pipe 92 to the top of tank 75.

Of course, it will be obvious to those skilled in the art that the sizing and proportionate size of the various orifices in the system is important to proper functioning of the novel starting and feed system disclosed herein. A typical example of a system operating successfully in accordance with the invention will thus be described, but it should be understood that the various dimensions recited are not in any sense limiting, but merely illustrative of the features of the invention. Thus, using a starting air pump having an aproximate displacement of 19.4 cubic inches, and a fuel tank having a total volume of about 86 cubic inches, the pump outlet orifice 47 may be of 0.055 inch diameter, and the starting air control orifice 50 may be of 0.052 inch diameter. The tube 32 in this example maintains an air space in the top of the tank of about 25.7 cubic inches when the tank is full. The fuel metering orifice 40 in such a system has an accurately sized diameter of 0.0094 inch, and the valve 38 may be an adjustable needle valve of proportionately larger capacity. The starting air pressurizing control orifice 58 has a diameter of 0.059 inch, the running or main pressurizing control orifice 67 has a diameter of 0.052 inch, and in the formulation supply system the pressurizing control orifice 87 has a diameter of 0.062 inch and the formulation flow limiting orifice has a diameter of 0.044 inch. With a system embodying these dimensional relations, and embodying the features of this invention, reliable and efficient fog generating apparatus has been constructed, exhibiting dependable starting and running characteristics, including ease of starting and steady state running.

While the form of apparatus herein described constitues a preferred embodiment of the invention, it is to be understood that the invention is not limited to this precise form of apparatus, and that changes may be made therein without departing from the scope of the invention which is defined in the appended claims.

What is claimed is:
1. In combination with a resonant intermittent combustion device having a combustion chamber opening at one end into a tail pipe forming a resonant system therewith, a charge admission valve means controlling flow into said chamber providing for intake therethrough of combustible charges and adadpted to prevent escape of products of combustion therethrough, and means forming an inlet passage to said valve means including an inlet member forming a path from the atmosphere to said valve means; the improvement comprising a starting system for said engine arranged to supply a properly metered combustible starting charge to said combustion chamber including a closed fuel tank and a fuel supply line connected from said tank to said inlet member in the path to said valve means, a fixed fuel metering orifice in said supply line, said metering orifice providing the sole effective restriction to flow of fuel between said tank and said inlet member whereby a constant predetermined restriction to flow exists at all times between said tank and said inlet member a manually operable air pump having a capacity of predetermined relation with respect to the capacity of said fuel tank, flow divider means receiving the air flow from the outlet of said pump and providing two separate flow paths therefrom, a starting air pipe receiving air from one of said paths and directing the air into said inlet member, a pressurizing pipe receiving air from the other of said paths and directing the air into said fuel tank, separate fixed orifice means in each of said paths having a predetermined relation to each other whereby air from said pump is at all times divided into fixed proportions between said starting air pipe and said pressurized pipe, and a fill tube in said fuel tank extending a predetermined distance below the top thereof and establishing a minimum air space in said tank during filling thereof which is related to the capacity of said pump whereby the maximum pump capacity in insufficient to maintain a constant superatmospheric pressure in said tank and is sufficient only to cause a momentary increase in air pressure within said air space to produce a momentary surge of starting fuel through said fuel supply tube in timed relation to delivery of starting air through said starting air pipe in response to manipulation of said pump.

2. Apparatus as defined in claim 1 wherein said fixed fuel metering orifice is of such small cross-section that frictional resistance to flow of fuel therethrough is a major factor in controlling the volume of fuel flow through said orifice.

3. In combination with a resonant intermittent combustion device having a combustion chamber opening at one end into a tailpipe forming a resonant system therewith, a charge admission valve means controlling flow into said chamber providing for intake only therethrough of combustible charges, an inlet member forming a path from the atmosphere to said valve means, a fuel supply line connected to direct fuel into said inlet member, a closed fuel tank connected to said fuel supply line, metering orifice means in said fuel supply line providing the sole restriction to flow of fuel between said tank and said inlet member, said orifice means having a fixed and constant opening during starting and running of the device, a pressurizing line extending from said combustion chamber to said tank, a second orifice means in said pressurizing line operative to damp the pressure oscillations therein resultant from intermittent combustion in said chamber to a net positive fuel feeding pressure applied to the fuel in said tank to maintain a substantially constant flow of fuel through said fuel supply line and said metering orifice during operation of the device, and starting means operative to supply simultaneously a flow of starting air of predetermined quantity into said inlet member and a flow of a predetermined quantity of pressurizing air into said tank independently of said second orifice means to cause a momentary pulse of fuel flow through said metering orifice means.

References Cited in the file of this patent
UNITED STATES PATENTS

| | | |
|---|---|---|
| 2,858,162 | Frank | Oct. 28, 1958 |
| 2,872,783 | Frank et al. | Feb. 10, 1959 |
| 2,985,359 | Hanje | May 23, 1961 |